US008463292B2

(12) United States Patent
Zhang

(10) Patent No.: US 8,463,292 B2
(45) Date of Patent: Jun. 11, 2013

(54) TDOA—BASED RECONSTRUCTION OF BASE STATION LOCATION DATA

(75) Inventor: Yang Zhang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 150 days.

(21) Appl. No.: 12/774,802

(22) Filed: May 6, 2010

(65) Prior Publication Data

US 2010/0331013 A1 Dec. 30, 2010

Related U.S. Application Data

(63) Continuation-in-part of application No. 12/493,323, filed on Jun. 29, 2009, now abandoned.

(51) Int. Cl.
*H04W 24/00* (2009.01)

(52) U.S. Cl.
USPC ............... 455/456.2; 455/456.1; 455/423; 455/424

(58) Field of Classification Search
USPC ........... 455/456.1–457, 560, 561, 404, 414.2, 455/440, 423–425, 67.11–67.16
See application file for complete search history.

(56) References Cited

U.S. PATENT DOCUMENTS

| | | | |
|---|---|---|---|
| 6,289,280 B1* | 9/2001 | Fernandez-Corbaton et al. | 701/469 |
| 6,748,224 B1* | 6/2004 | Chen et al. | 455/456.1 |
| 7,024,331 B2* | 4/2006 | Jones et al. | 702/150 |
| 7,203,499 B2* | 4/2007 | Wigren | 455/456.1 |
| 7,346,345 B2* | 3/2008 | Ruutu et al. | 455/423 |
| 2004/0097241 A1* | 5/2004 | Duffet-Smith et al. | 455/456.1 |
| 2004/0242234 A1 | 12/2004 | Klenner | |
| 2007/0243882 A1* | 10/2007 | Edge | 455/456.1 |
| 2008/0318596 A1* | 12/2008 | Tenny | 455/456.2 |
| 2009/0131075 A1* | 5/2009 | Mazlum et al. | 455/456.1 |
| 2010/0120447 A1* | 5/2010 | Anderson et al. | 455/456.1 |
| 2010/0291907 A1* | 11/2010 | MacNaughtan et al. | 455/414.1 |
| 2011/0244884 A1* | 10/2011 | Kangas et al. | 455/456.1 |
| 2012/0165012 A1* | 6/2012 | Fischer et al. | 455/435.1 |

FOREIGN PATENT DOCUMENTS

| | | |
|---|---|---|
| WO | 02/23215 A1 | 3/2002 |
| WO | 03/010552 A2 | 2/2003 |
| WO | 03/027705 A2 | 4/2003 |
| WO | 2008/093103 A2 | 8/2008 |
| WO | 2009/065012 A1 | 5/2009 |

OTHER PUBLICATIONS

Kelley, B. et al. "OFDM Location-Based Routing Protocols in Ad-Hoc Networks." Proceeding of the Wireless Hive Networks Conference, Austin, Texas, USA, Aug. 7-8, 2008.
Open Mobile Alliance. "Enable Release Definition for Secure UserPlane for Location (SUPL)." Candidate Version 2.0—Jun. 27, 2008. Open Mobile Alliance, OMA-ERELD-SUPL-V2_0-20080627-C.

(Continued)

*Primary Examiner* — Sharad Rampuria
(74) *Attorney, Agent, or Firm* — Coats & Bennett, P.L.L.C.

(57) ABSTRACT

Methods and apparatus for determining a position estimate for a base station transceiver node in a wireless communication system are disclosed. An exemplary method comprises obtaining a first set of time-difference-of-arrival (TDOA) measurement data from a first plurality of mobile stations, the first set of TDOA measurement data corresponding to transmissions received at the first plurality of mobile stations from the first base station transceiver node and a second base station transceiver node, obtaining first mobile station location data identifying a mobile station position corresponding to each TDOA measurement represented in the first set of TDOA measurement data, and computing an estimated position for the base station transceiver node as a function of the first mobile station location data and the first set of TDOA measurement data.

36 Claims, 8 Drawing Sheets

OTHER PUBLICATIONS

Open Mobile Alliance. "Secure User Plane Location Requirements." Draft Version 3.0—Apr. 29, 2009. Open Mobile Alliance, OMA-RD-SUPL-V3_0-20090429-D.

Open Mobile Alliance. "Secure User Plane Location Architecture." Candidate Version 2.0—Jun. 27, 2008. Open Mobile Alliance, OMA-AD-SUPL-V2_0-20080627-C.

3rd Generation Partnership Project 2. "IP Based Location Services." Stage 1 Requirements, 3GPP2 S. R0066-0, Version 1.0, Apr. 17, 2003.

Gerstenberger, D. et al. "Base Station Mapping with Angle-of-Arrival and Timing Advance Measurements." Co-pending U.S. Appl. No. 12/486,350, filed Jun. 17, 2009.

* cited by examiner

TDOA—BASED RECONSTRUCTION OF BASE STATION LOCATION DATA

RELATED APPLICATION

This application claims priority under 35 U.S.C. §120 to co-pending U.S. patent application Ser. No. 12/493,323, titled "TDOA-Based Reconstruction of Base Station Location Data" and filed 29 Jun., 2009. The entire contents of said co-pending application are incorporated by reference herein.

TECHNICAL FIELD

The present invention relates generally to wireless communications systems, and more particularly to techniques and systems for determining the location of a base station transceiver node in a wireless communication system.

BACKGROUND

Mobile station positioning has become increasingly important, not only for supporting enhanced emergency calling (e.g., E-911 in the United States), but also for supporting commercial location-based services. Although several technologies for determining the location of wireless mobile stations have been deployed, a technique called Observed Time-Difference Of Arrival (OTDOA) is widely used in modern cellular telecommunications networks.

With the OTDOA technique, a mobile station's location can be determined based on measurements of the following parameters: (1) time-difference-of-arrival (TDOA) measurements of downlink radio signals received at a mobile station from several base stations; (2) actual real time differences (RTDs) between the transmissions of pairs of base stations, at the time when the TDOA measurements are made; and (3) geographical positions (e.g., latitude and longitude) of the several base stations. Measurements using downlink signals from at three different base stations are required. The accuracy of each of these measurements contributes to the overall accuracy of the position estimate. However, more TDOA measurements bring better accuracy.

There are several approaches to determining the real time difference for a pair of base stations. One technique involves transmissions from base stations that are synchronized to one another. In this case the RTD for any given pair of base stations is a known constant value that may be stored in a database and used by the positioning function when making a position estimate based on TDOA measurements for that base station pair. For optimal accuracy, the synchronization should be done to a level of accuracy on the order of tens of nanoseconds, as only ten nanoseconds of uncertainty contributes 3 meters of error to the position estimate. Drift and jitter in the synchronization timing must also be well controlled, as these also contribute to uncertainty in the position estimate. Currently, synchronization to this level of accuracy is currently only readily available through satellite-based time transfer techniques. Base stations in systems employing a time-division duplexing (TDD) operating mode are often synchronized.

Alternatively, base stations may be left to run "free," within some constraint on the maximum frequency error allowed in the system. In this scenario, the RTD will change over time, although usually slowly, given tight frequency accuracy specifications for the controlling reference clocks. The rate of change will depend on the frequency differences between the reference clocks for a given pair of base stations, as well as on the jitter associated with each clock.

The OTDOA positioning technique may be applied in at least two modes: UE-assisted OTDOA and UE-based OTDOA. ("UE", or "User Equipment", is a term used in standards promulgated by the $3^{rd}$ Generation Partnership Project to refer to end-user wireless communication devices. As used herein, the terms "UE," "mobile station," and "mobile terminal" are equivalent, and are intended to generally refer to an end-user wireless communication device, whether portable or fixed, or whether self-contained or built into another device such as a personal computer or an automobile. These terms are thus intended to encompass, without limitation, machine-to-machine devices as well as handheld mobile phones.) These two modes differ in where the actual position calculation is carried out. In the UE-assisted mode, the mobile station measures the TDOA of several cells and sends the measurement results to the network, where a positioning node (e.g., a location server) carries out the position calculation. In the UE-based mode, on the other hand, the mobile station makes the measurements and carries out the position calculation as well. To perform UE-based positioning, the mobile station clearly requires additional information, such as the position of the measured base stations and the timing relationships among the base stations.

OTDOA has been standardized by 3GPP for GSM/EDGE Radio Access Networks (GERAN) as well as for UMTS Radio Access Network (UTRAN). (In the former specification, the technique is referred to as Enhanced Observed-Time-Difference, or E-OTD.) Standardization in 3GPP of positioning techniques for Evolved UTRAN (E-UTRAN) is still ongoing, but OTDOA has already been widely accepted as a very important positioning method In fact, some U.S. operators have begun planning for OTDOA deployment in Long Term Evolution (LTE) networks in about 2010 or 2011. Moreover, it is also very clear that OTDOA-related protocols in E-UTRAN will soon be adopted by the Open Mobile Alliance (OMA) as a basis for so-called User Plane positioning. As a result, OTDOA-based positioning techniques are continuing to grow in importance.

SUMMARY

Information specifying the location of all base stations in a given wireless network is of great interest to service providers that wish to provide location-based services. However, this information generally is available only to the operators of the wireless networks. Therefore, even if a location-based services provider has access to TDOA measurements from a given mobile station, services providers have previously been unable to use those measurements to determine the mobile station's location without cooperation from the wireless network's operator. Thus, techniques for determining accurate estimates of base station locations that do not require access to the wireless network's control plane signaling are needed.

Disclosed herein are various methods and apparatus for determining a position estimate for a base station transceiver node in a wireless communication system. Generally speaking, these methods and apparatus exploit time-difference-of-arrival (TDOA) measurements performed by mobile stations for which geographic locations are already known. By combining these known locations with the TDOA measurements, an estimated base station position can be computed. This estimated base station position may be used, for example, in subsequent positioning of mobile stations for which locations are not already known (e.g., mobile stations not equipped with GPS technology). The estimated base station position may also be used to update a database of base station coordinates for the wireless network.

An exemplary method, according to some embodiments of the invention, comprises obtaining a first set of time-difference-of-arrival (TDOA) measurement data from a first plurality of mobile stations, the first set of TDOA measurement data corresponding to transmissions received at the first plurality of mobile stations from the first base station transceiver node and a second base station transceiver node, obtaining first mobile station location data identifying a mobile station position corresponding to each TDOA measurement represented in the first set of TDOA measurement data, and computing an estimated position for the base station transceiver node as a function of the first mobile station location data and the first set of TDOA measurement data.

In some embodiments, the first set of TDOA measurement data is obtained from at least five mobile stations, and computing the estimated position for the first base station transceiver node comprises solving a system of equations based on the first mobile station location data, the first set of TDOA measurement data, and five unknown variables. These five unknown variables comprise first and second coordinate values for the first base station transceiver, first and second coordinate values for the second base station transceiver node, and a first real-time-difference value corresponding to a time offset between transmissions from the first and second base station transceiver nodes. In some of these embodiments, solving the system of equations comprises computing estimates for the five unknown variables using an iterative least squares algorithm.

In some embodiments, after a position estimate for a first base station is determined, a second set of TDOA measurement data from a second plurality of mobile stations is obtained, the second set of TDOA measurement data corresponding to transmissions received at the second plurality of mobile stations from the first base station transceiver node and a third base station transceiver node. After obtaining second mobile station location data identifying a mobile station position corresponding to each TDOA measurement represented in the second set of TDOA measurement data, an estimated position for the third base station transceiver node is computed, by solving a system of equations based on the estimated location for the first base station transceiver node, the second set of TDOA measurement data, the second mobile station location data, and three additional unknown variables, the three additional unknown variables comprising first and second coordinate values for the third base station transceiver and a second real-time-difference value corresponding to a time offset between transmissions from the first and third base station transceiver nodes.

In still other embodiments, the set of TDOA measurement data is obtained from at least six mobile stations and the system of equations is further based on a sixth unknown variable corresponding to a relative clock drift rate between the first and second base station transceiver nodes. In some of these embodiments, the first set of TDOA measurement data is obtained from at least seven mobile stations, and the system of equations is further based on a seventh unknown variable corresponding to a second-order relative clock drift rate between the first and second base station transceiver nodes. In various embodiments, the first set of TDOA measurement data comprises timestamp information indicating the times at which the TDOA measurement data was measured. This timestamp information may be based, for example, at least in part, on global navigation satellite system timing data, such as GPS timing data. In other embodiments, the timestamp information comprises indexes to a radio-frame numbering scheme in the wireless communication system.

In some embodiments, the TDOA measurement data is selected from a database of measurement data. In some of these embodiments, the database of TDOA measurements is evaluated to identify TDOA measurements involving a first base station transceiver node of interest. A second base station transceiver node is selected by determining which base station transceiver node other than the first base station is involved in at least as many of the identified TDOA measurements as any other base station transceiver node, and some or all of those of the identified TDOA measurements that involve the second base station transceiver node are included in the set of TDOA measurement data used to estimate the position of the first base station transceiver node.

In some embodiments, obtaining the set of TDOA measurement data used to estimate the base station position comprises limiting the first set of TDOA measurement data to TDOA measurements taken within a time window of a predetermined duration. In other embodiments, obtaining the first set of TDOA measurement data comprises sending TDOA measurement requests to the first plurality of mobile stations and receiving TDOA measurements in response.

In addition to the disclosed methods for estimating base station positions, corresponding apparatus are also disclosed. In particular, position-estimating nodes configured to carry out one or more of the techniques summarized above are described. The present invention may, of course, be carried out in other ways than those specifically set forth herein without departing from essential characteristics of the invention. Upon reading the following description and viewing the attached drawings, the skilled practitioner will recognize that the described embodiments are illustrative and not restrictive, and that all changes coming within the scope of the appended claims are intended to be embraced therein.

DETAILED DESCRIPTION

As discussed above, precise location information for base stations in a wireless network is needed to perform TDOA-based positioning of mobile stations. Because location-based services are increasingly of interest to commercial service providers, many parties are interested in performing mobile station positioning. As a result, information specifying the location of all base stations in a given wireless network is of great interest to these parties. However, this information generally is available only to the operators of the wireless networks—access to this cell data is not straightforward for service providers. Therefore, even if a location-based services provider has access to TDOA measurements from a given mobile station, the services provider is unable to use those measurements to determine the mobile station's location without cooperation from the wireless network's operator.

In a related co-pending U.S. patent application Ser. No. 12/486,350, filed 17 Jun. 2009, techniques are disclosed for estimating a base station's position based on angle-of-arrival and/or timing advance measurements made by the base station. The entire contents of this application, which include a summary of several mobile positioning technologies, are incorporated herein by reference. Of course, a service provider operating from outside of the wireless network of interest is unlikely to have access to this measurement data—thus additional techniques for determining an estimate of an unknown geographic position for a base station transceiver are needed.

The Open Mobile Alliance™, a telecommunications industry forum developing standards for mobile data services, is currently developing specifications for so-called Secure User Plane Location (SUPL) technology. SUPL is intended to provide a supporting technology for Location-Based Services that are agnostic with respect to the radio access technologies underlying the supported wireless communications networks, and operates using IP (Internet Protocol) communications rather than telecommunications-based messaging and signaling. From a user point of view, a SUPL system consists primarily of a server and a SUPL-enabled mobile station—the server and mobile station interact at the network layer and thus require minimal interaction with nodes deep inside the wireless network.

Figure 1:
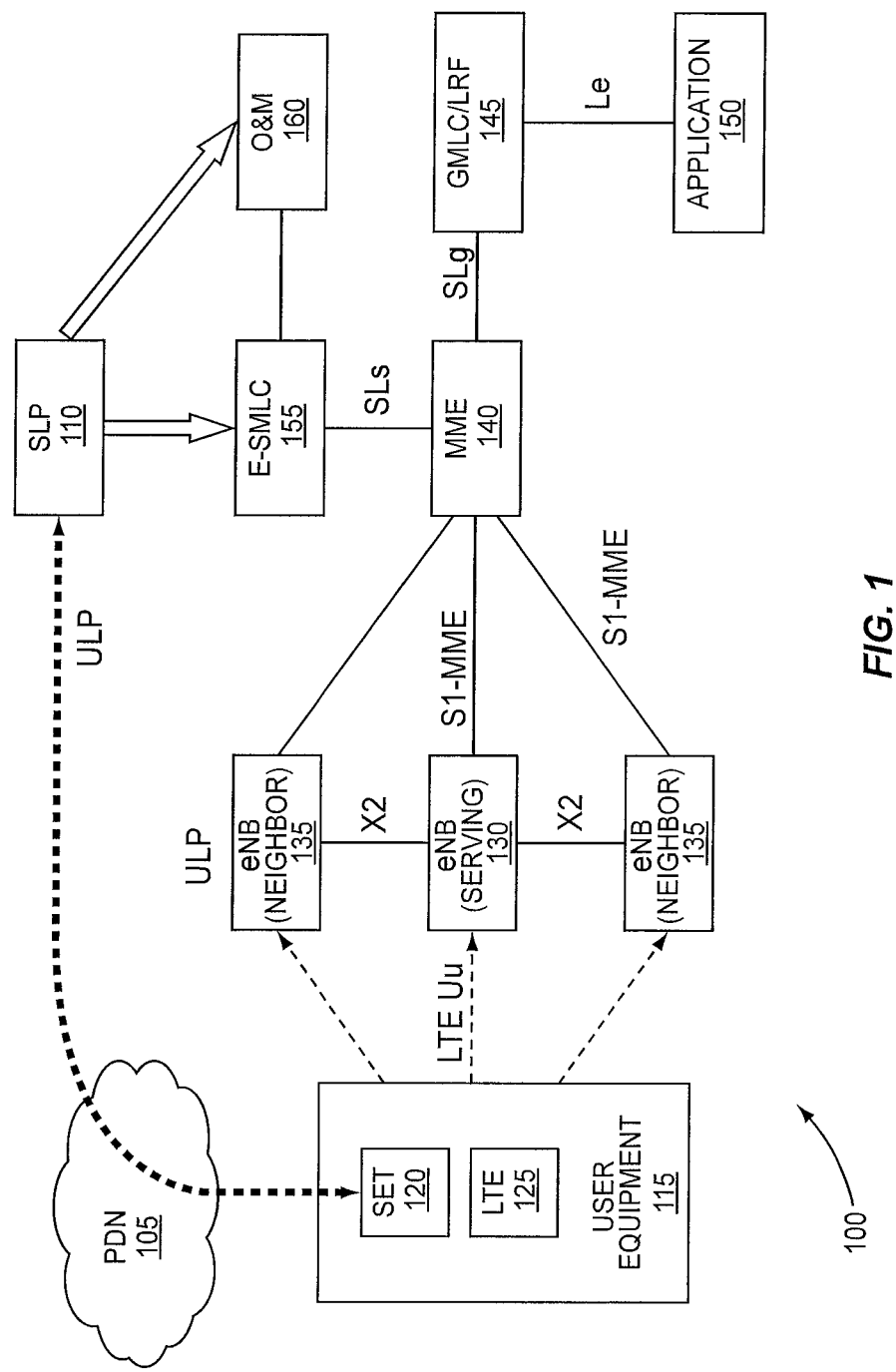
FIG. 1 is a system schematic illustrating an exemplary location services network architecture.

FIG. 1 is a network block diagram illustrating components of an LTE network (3GPP E-UTRAN) 100 augmented with a SUPL Location Platform (SLP) 110. The SLP 110 may be controlled by the network operator, in some instances, or by a third-party services provider, in others. In either case, as will be shown below, the inventive techniques disclosed herein may reduce the dependency the SLP 110 has on the LTE network elements.

A mobile station, or user equipment (UE) 115 includes an LTE function 125 for communicating with the serving LTE base station (evolved Node B, or "eNB") 130. Mobile station 115 is also configured with an "SUPL-Enabled Terminal" (SET) function 120, for communicating with the SLP 110. These latter communications are at the user plane level, using IP, and are thus illustrated with a heavy dashed line passing between UE 115 and SLP 110, through packet data network (PDN) 105. The details of implementing a SET-equipped LTE handset are well known to those of ordinary skill in the art, as are the details of the other various LTE network components illustrated in FIG. 1, and are unnecessary to a complete understanding of the present invention. These details are therefore not described further herein. However, further information regarding SUPL and LTE positioning may be obtained by consulting the 3GPP specification 3GPP TS 23.271, "Functional stage 2 description of location services" and the OMA specification "Secure User Plane Location Architecture", Open Mobile Alliance, OMA-AD-SUPL-AD-V2_0.

Figure 2:
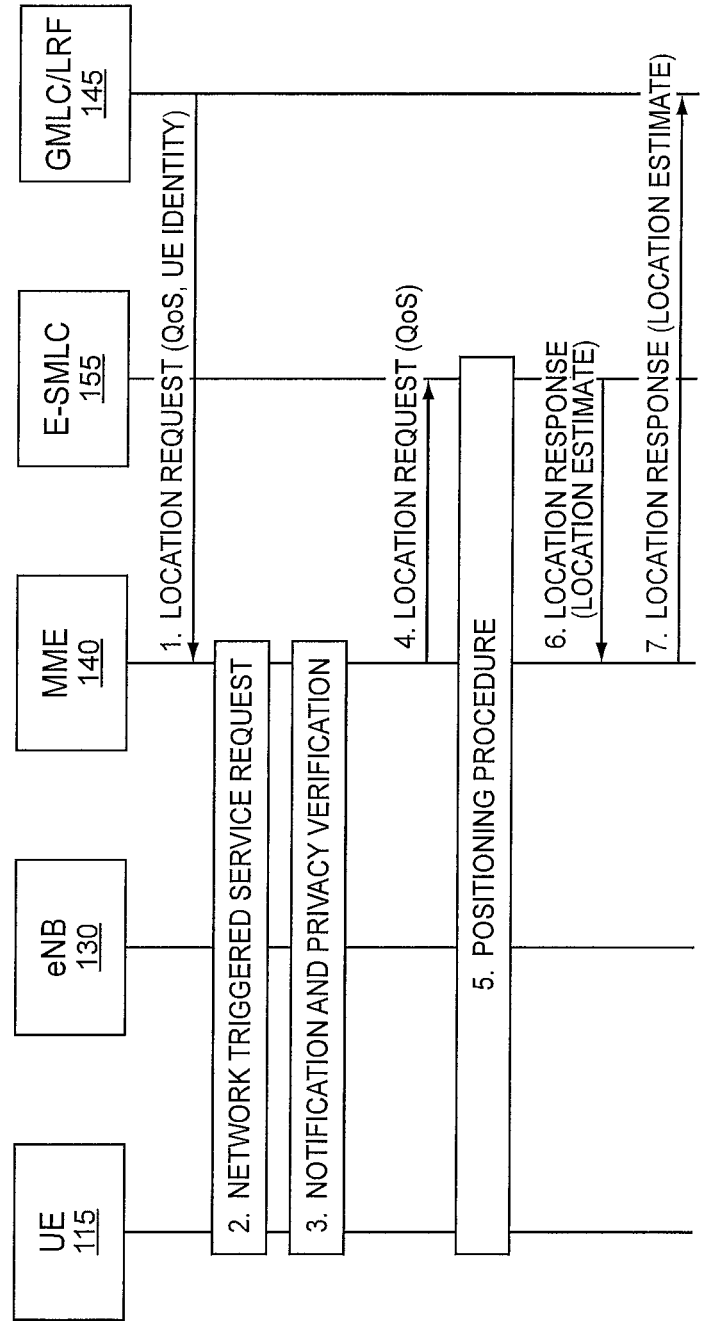
FIG. 2 illustrates a location procedure using control plane signaling.
Figure 3:
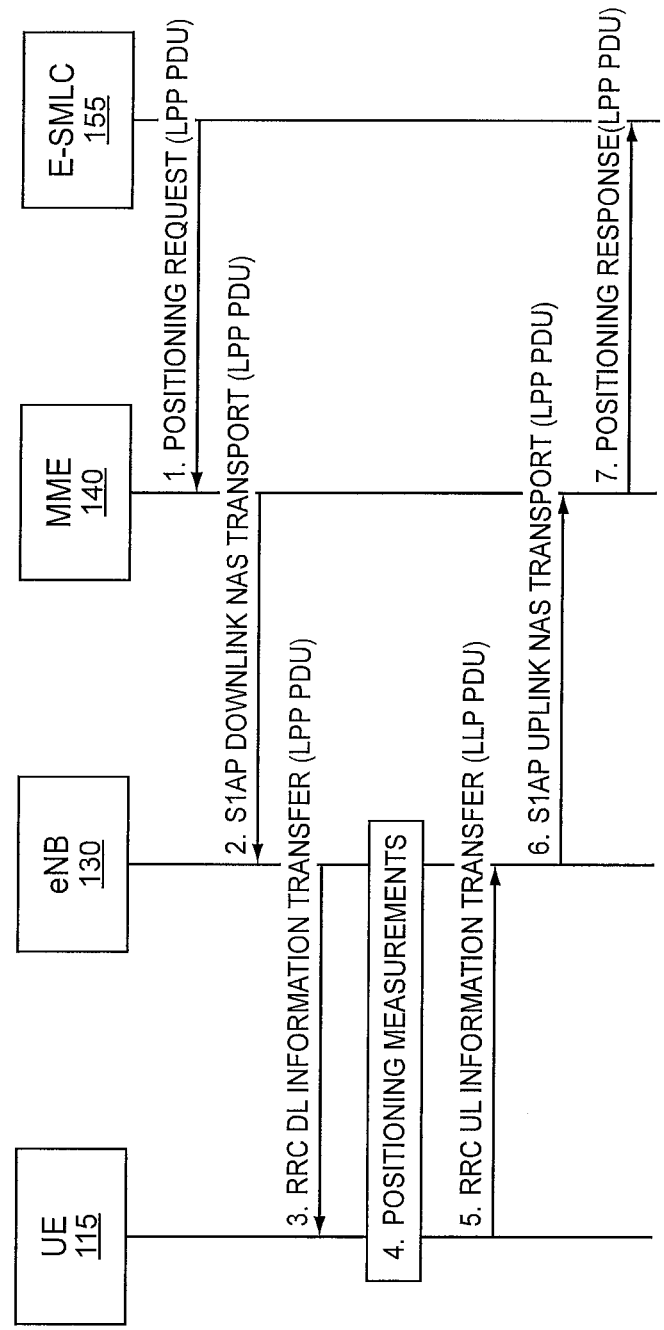
FIG. 3 illustrates a positioning procedure using control plane signaling.

On the other hand, an understanding of the overall network operation in the context of LTE positioning operations may be helpful in understanding the inventive techniques disclosed herein. Thus, FIG. 2 illustrates the control plane signaling associated with a general positioning procedure in an LTE network like the one pictured in FIG. 2, where the positioning procedure is initiated by a Gateway Mobile Location Center/Location Retrieval Function (GMLC/LRF) 145. In this case, a mobile station's location may have been initiated by a network operator-based service, such as via application 150 in FIG. 1. FIG. 3 provides additional details of one possible solution for the positioning procedure between the Evolved Serving Mobile Location Center (E-SMLC) 155 and the UE 115, in this case using OTDOA measurements. In addition to being part of the overall LTE positioning procedure of FIG. 2, this procedure may be initiated via the SLP 110, in response to a request from any SET-equipped client device.

Referring to FIG. 2 (with the network block diagram of FIG. 1 in mind), the illustrated procedure may be summarized as follows:

1. The GMLC 145 sends a location request to the serving Mobility Management Entity (MME) 140, indicating a UE identity and a required quality-of-service (QoS). For a commercial mobile-terminating location request (MT-LR), UE privacy preferences are also included (as currently supported for GSM and UMTS). Note that the MME 140 will already know the UE positioning capabilities, either from the initial attachment procedure or from an prior MME or SGSN following changes in tracking area or routing area.

2. If the UE 115 is in ECM-IDLE state, then the MME 140 performs a network triggered service request (as defined in 3GPP TS 23.401) in order to establish a signaling connection with UE 115 and to assign a specific eNB 130. (Note that the serving eNB may retrieve timing and location information for neighbor eNB's 135 via the X2 interface.

3. For a commercial MT-LR, the MME 140 may notify the UE 115 concerning the location request and verify its privacy, provided that the UE 115 supports notification and privacy verification.

4. The MME 140 forwards the location request to the E-SMLC 155, including the QoS and UE positioning capabilities. The UE identity will not be critical because the MME 140 can maintain the association with the UE 115.

5. The E-SMLC 155 performs a positioning procedure appropriate to the particular QoS, architecture and UE capabilities. The details of this procedure using OTDOA measurements are shown in FIG. 3.

6. The E-SMLC 155 returns the resulting location information (e.g. location estimate) to the MME 140.

7. The MME 140 returns the location information to the GMLC 145.

Referring now to FIG. 3 (again with the block diagram of FIG. 1 in mind), details of the positioning procedure between E-SMLC 155 and UE 115 are illustrated. (Because the positioning protocols in LTE are still undergoing standardization, the final procedures may differ from this diagram. Nevertheless, the illustrated procedure is still instructive.) This procedure may be summarized as follows:

1. The E-SMLC 155 sends a Positioning Request to the MME 140, the Positioning Request carrying an LTE Positioning Protocol (LPP) Protocol Data Unit (PDU). The LPP PDU may request specific measurements by the UE 155, provide assistance data, or query for the UE capabilities. For OTDOA positioning in particular, E-SMLC 115 may request cell ID, base station timing, and base station location information from eNB 130 or from O&M server 160.

2. The MME 140 forwards the LPP PDU to the serving eNodeB 130 in an S1AP Downlink NAS Transport message, thereby making the contents of the LPP PDU transparent to the both the MMS 140 and eNodeB 130. The MME need not retain state information for the positioning request, as it can treat the subsequent response (see step 6 below) as a separate transaction. However, it must retain state information associated with the location request from the GMLC 145 (step 1 of FIG. 2) and the location request to the E-SMLC 155 (step 4 of FIG. 2).

3. The serving eNodeB 130 forwards the LPP PDU to UE 115 in an RRC Downlink Information Transfer message.

4. UE 115 performs any positioning measurements requested by the LPP PDU. In OTDOA-based positioning procedures in particular, UE 115 measure the time-difference-of-arrival between each pair of base stations among those base stations identified by E-SMLC 155 in earlier messages.

5. UE 115 returns measurement information and/or information concerning its capabilities or requested assistance data in an LPP PDU to the eNodeB 130, using an RRC Uplink Information Transfer message.

6. eNodeB 130 forwards the LPP PDU to the MME 140 in an S1AP Uplink NAS Transport message.

7. MME 140 forwards the LPP PDU to the E-SMLC 155 in a Positioning Response.

Steps 1 to 7 may be repeated to send new assistance data and request further measurements.

As seen in FIGS. 2 and 3, extensive control plane signaling is used in a conventional LTE positioning procedure. With user plane positioning, such as is enabled by SUPL, the signaling is simpler. (Note that user plane flow can be used not only in LTE, but also other access types.)

In particular, the architecture of the user plane is much simpler than in control plane. Normally only two nodes (SLP and SET) are involved, as in FIG. 1, communicating with one another through a Userplane Location Protocol (ULP) over an IP connection. The LTE Positioning Protocol (LPP) can be "borrowed" by ULP messages, providing payload for positioning messaging. For OTDOA-based positioning, SLP 110 can request and/or retrieve network-specific information, such as the serving and neighbor base station timing and base station locations, from E-SMLC 155 or O&M server 160. With this conventional approach, even if SLP 110 is able to obtain TDOA measurement data directly from UE 115, via the Userplane Location Protocol, the SLP 110 is still dependent on the network and its control plane signaling for network-specific information. The inventive techniques disclosed herein may be used to relieve the SLP 110 of this dependency.

Using these techniques, TDOA measurements obtained from mobile stations for which a position is already known (such as via GPS-based positioning) may be utilized to determine base station positions. With these techniques, a database of base station locations can be constructed (or reconstructed, since such a database is likely already maintained by the network operator.) As will be seen in the detailed discussion that follows, an unknown base station can be estimated with as few as three TDOA measurements performed by mobile stations at different locations. The accuracy of the base station position estimates can be improved with an increase in the number of measurements used.

Figure 9:
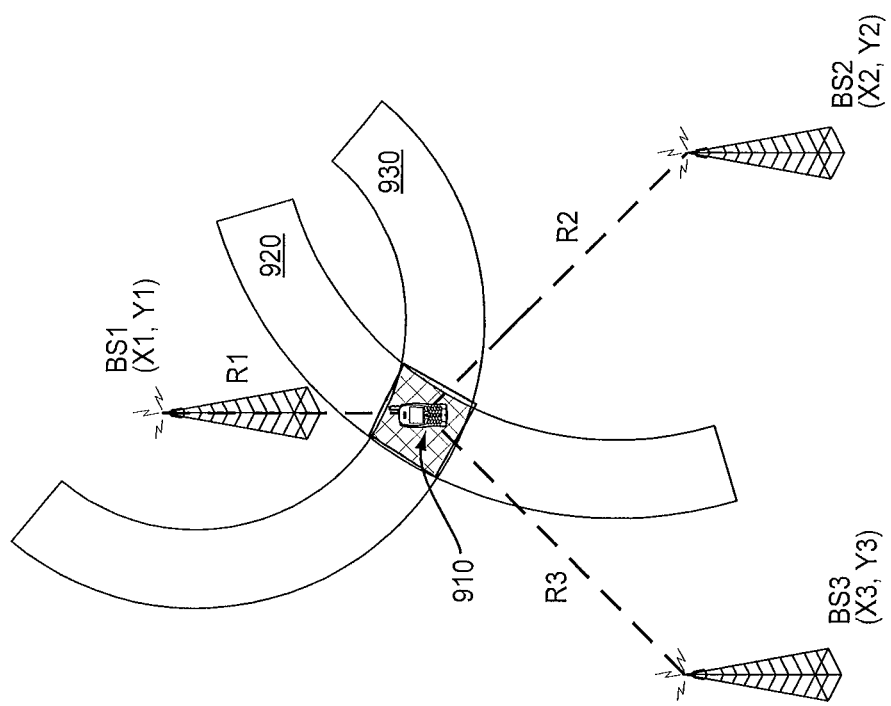
FIG. 9 illustrates time-difference-of-arrival positioning of a mobile station.

The basic principles of mobile station positioning using OTDOA are described first, to provide a basis for understanding the detailed operation of the inventive methods and apparatus for determining a base station's position. FIG. 9 illustrates a simple network, including a single mobile station 910 that is able to "hear" transmissions from three base stations, BS1, BS2, and BS3. These base stations have location coordinates $(x_i, y_i)$, for i=1, 2, 3, while mobile station 910 has a position denoted by coordinates $(x_{UE}, y_{UE})$. (Those skilled in the art will recognize that the details of the coordinate system are unimportant—a variety of coordinate systems, including the World Geodetic System, may be used. In the discussion that follows, it is assumed that only two-dimensional coordinates are needed. Of course, the techniques disclosed herein can readily be extended to three-dimensional positioning, although OTDOA positioning based on terrestrial base stations may generally suffer from large uncertainties in altitude determinations.)

Mobile station 910 measures the observed time-differences-of-arrival (OTDOAs) $\Delta t_{12}$ and $\Delta t_{13}$, corresponding to the observed time differences (at the mobile station) between base stations 1 and 2, and between base stations 1 and 3, respectively. A network function either measures or is able to ascertain the corresponding real time differences (RTDs) $RTD_{12}$ and $RTD_{13}$ between these same pairs of base stations. The relationship between all of these parameters is given by:

$$\sqrt{(x_{UE}-x_1)^2+(y_{UE}-y_1)^2} - \sqrt{(x_{UE}-x_2)^2+(y_{UE}-y_2)^2} = (\Delta t_{12}-RTD_{12}+n_{12})*c$$

$$\sqrt{(x_{UE}-x_1)^2+(y_{UE}-y_1)^2} - \sqrt{(x_{UE}-x_3)^2+(y_{UE}-y_3)^2} = (\Delta t_{13}-RTD_{13}+n_{13})*c, \quad (1)$$

where $n_{ij}$ denotes TDOA measurement errors and c is speed of light.

The expressions in Equation (1) generally define two intersecting hyperbolas; the uncertainty introduced by the noise terms $n_{ij}$ results in the hyperbolic strips 920 and 930 illustrated in FIG. 9. The actual position $(x_{UE}, y_{UE})$ of UE 910 falls within the region defined by the intersection of hyperbolic strips 920 and 930 (indicated by cross-hatching). This position can be estimated by solving these nonlinear equations. Various approaches to solving this problem are well known— one approach uses Taylor-series linearization, followed by the use of an iterative Least Square algorithm to produce a solution from the linearized equation set. Those skilled in the art will appreciate that additional TDOA measurements for a fourth (and further) base stations may be used to extend the optimization problem presented by Equation (1)—the use of additional measurements will generally improve the accuracy of the UE position estimate.

As is apparent from this description of OTDOA-based positioning of mobile stations, accurate base station positions $(x_i, y_i)$ must be known. This is true regardless of whether the calculation is performed by the mobile station itself (UE-based OTDOA) or not (UE-assisted OTDOA). However, since network operators will not necessarily freely disclose this proprietary base station location information to third parties, the availability of accurate base station location data can be a bottleneck for service providers who do not have a direct relationship with a network operator. This bottleneck can frustrate the widespread deployment of location-based services based on user plane signaling. Therefore, a solution for building a database of base station locations, without support from the network operator, is highly desirable. Once assembled, this base station location database can be used for OTDOA-based mobile station position, as well as for other mobile positioning technologies such as AGPS/AGNSS and Cell ID based positioning.

Figure 10:
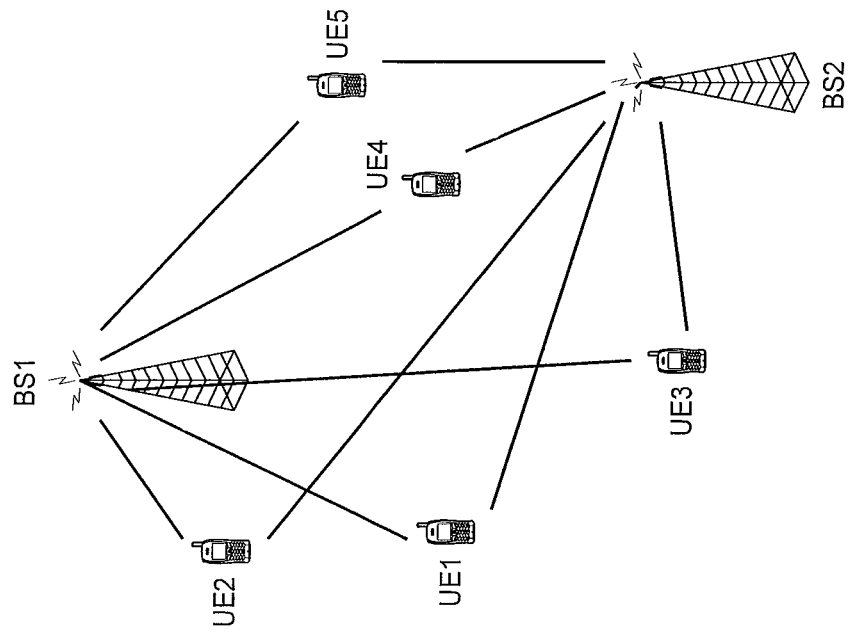
FIG. 10 illustrates a network scenario for estimating the locations of two base stations.

The principle behind an exemplary method for determining position estimates for base station transceivers can be demonstrated with reference to FIG. 10, which illustrates a pair of base stations BS1 and BS2, and five mobile stations, designated $UE_i$, for i=1 . . . 5. From the perspective of a location-based services server located outside the network to which BS1 and BS2 belong, the locations of BS1 and BS2 (($x_1,y_1$) and ($x_2,y_2$)) are unknown. However, assume that the location server is able to collect TDOA measurements from mobile stations at each of at least five different positions, as in FIG. 10. (These measurements may be made by different mobile stations, or by a single mobile station at five different locations). These OTDOA measurements might be obtained directly from the mobile station, through user plane messaging, thus avoiding the involvement of LTE network elements.

The OTDOA measurement $\Delta t_{UEi}$ from the i-th mobile station (or the mobile station at the i-th position) with respect to BS1 and BS2 then fits equation:

$$r_{UEi\_1} - r_{UEi\_2} = (\Delta t_{UEi} - RTD_{12} + n_{UEi}) * c. \quad (2)$$

or:

$$r_{UEi\_1} - r_{UEi\_2} + RTD_{12}*c = (\Delta t_{UEi} + n_{UEi})*c, \quad (3)$$

where $r_{UEi\_j}$ is the actual distance between the i-th mobile station and the j-th base station and:

$$r_{UEi\_1} - r_{UEi\_2} = \sqrt{(x_{UEi} - x_1)^2 + (y_{UEi} - y_1)^2} - \sqrt{(x_{UEi} - x_2)^2 + (y_{UEi} - y_2)^2}. \quad (4)$$

$$\begin{aligned}
f(x_1, y_1, x_2, y_2, RTD_1 * c) &= \sqrt{(x_{UEi} - x_1)^2 + (y_{UEi} - y_1)^2} - \\
&\quad \sqrt{(x_{UEi} - x_2)^2 + (y_{UEi} - y_2)^2} + \\
&\quad RTD_1 * c \\
&\approx f(x'_1, y'_1, x'_2, y'_2, RTD'_1 * c) + \\
&\quad \frac{\partial f}{\partial x_1} \cdot dx_1 + \frac{\partial f}{\partial y_1} \cdot dy_1 + \frac{\partial f}{\partial x_2} \cdot \\
&\quad dx_2 + \frac{\partial f}{\partial y_2} \cdot dy_2 + \frac{\partial f}{\partial (RTD_1 * c)} \cdot \\
&\quad d(RTD_1 * c) \\
&= (r'_{UEi\_1} - r'_{UEi\_2}) + RTD'_1 * c - \\
&\quad (x_{UEi} - x'_1) \cdot dx_1 / r'_{UEi\_1} - \\
&\quad (y_{UEi} - y'_1) \cdot dy_1 / r'_{UEi\_1} + \\
&\quad (x_{UEi} - x'_2) \cdot dx_2 / r'_{UEi\_2} + \\
&\quad (y_{UEi} - y'_2) \cdot dy_2 / r'_{UEi\_2} + \\
&\quad d(RTD_1 * c). 
\end{aligned} \quad (5)$$

Equation (3) can then be rewritten as:

$$Gd \approx h \quad (6)$$

where: (7)

$$G = \begin{bmatrix}
-\frac{(x_{UE1} - x'_1)}{r'_{UE1\_1}}, -\frac{(y_{UE1} - y'_1)}{r'_{UE1\_1}}, \frac{(x_{UE1} - x'_2)}{r'_{UE1\_2}}, \frac{(y_{UE1} - y'_2)}{r'_{UE1\_2}}, 1 \\
-\frac{(x_{UE2} - x'_1)}{r'_{UE2\_1}}, -\frac{(y_{UE2} - y'_1)}{r'_{UE2\_1}}, \frac{(x_{UE2} - x'_2)}{r'_{UE2\_2}}, \frac{(y_{UE2} - y'_2)}{r'_{UE2\_2}}, 1 \\
\ldots \\
-\frac{(x_{UEn} - x'_1)}{r'_{UEn\_1}}, -\frac{(y_{UEn} - y'_1)}{r'_{UEn\_1}}, \frac{(x_{UEn} - x'_2)}{r'_{UEn\_2}}, \frac{(y_{UEn} - y'_2)}{r'_{UEn\_2}}, 1
\end{bmatrix},$$

$$d = \begin{pmatrix} dx_1 \\ dy_1 \\ dx_2 \\ dy_2 \\ d(RTD_1 * c) \end{pmatrix}, \text{ and} \quad (8)$$

$$h = c \cdot \begin{pmatrix}
\Delta t_{UE1} - (r'_{UE1\_1} - r'_{UE1\_2}) + RTD'_1 * c + n_{UE1} \\
\Delta t_{UE2} - (r'_{UE2\_1} - r'_{UE2\_2}) + RTD'_1 * c + n_{UE2} \\
\ldots \\
\Delta t_{UEn} - (r'_{UEn\_1} - r'_{UEn\_2}) + RTD'_1 * c + n_{UEn}
\end{pmatrix}. \quad (9)$$

Further assume that the server can determine accurate position information for the five mobile stations $UE_i$ using other high-accuracy mobile station positioning methods, such as A-GPS or conventional GPS. Therefore, in the case of a synchronized network (where the real time difference corresponding to a TDOA measurement does not depend on the particular time at which the TDOA measurement was made), only five variables in the above equations are unknown: the base station coordinates for BS1 and B2 ($x_1,y_1$),($x_2,y_2$), and the real time difference value $RTD_{12}$. Since five independent TDOA measurements have been made, these five unknown values can be figured out.

For example, given a first guess of ($x'_1,y'_1,x'_2,y'_2,RTD'_{12}*c$) and n TDOA measurements ($n \geq 5$), the left side of the equation (3) can be linearized via Taylor-series (ignoring the 2nd and higher order terms) as follows:

A Least Square solution (ignoring the noise in h) is given by:

$$d = (G^T \cdot G)^{-1} \cdot G^T \cdot h \quad (10)$$

If TDOA measurement covariance matrix Q is available, the following solution can be used instead:

$$d = (G^T Q^{-1} G)^{-1} G^T Q^{-1} h, \text{ and} \quad (11)$$

$$\text{cov}(d) = (G^T Q^{-1} G)^{-1} \quad (12)$$

In either case, the base station position estimate may be updated for subsequent iterations according to:

$$(x'_1,y'_1,x'_2,y'_2,RTD_1'^*c) = (x'_1,y'_1,x'_2,y'_2,RTD_1'^*c) + d^T, \quad (13)$$

and the whole process repeated until the update d is sufficiently small. The final ($x'_1,y'_1,x'_2,y'_2,RTD_1'^*c$) represents the position estimates for base stations BS1 and BS2, as well as an estimate of the RTD between the base station pair.

Figure 4:
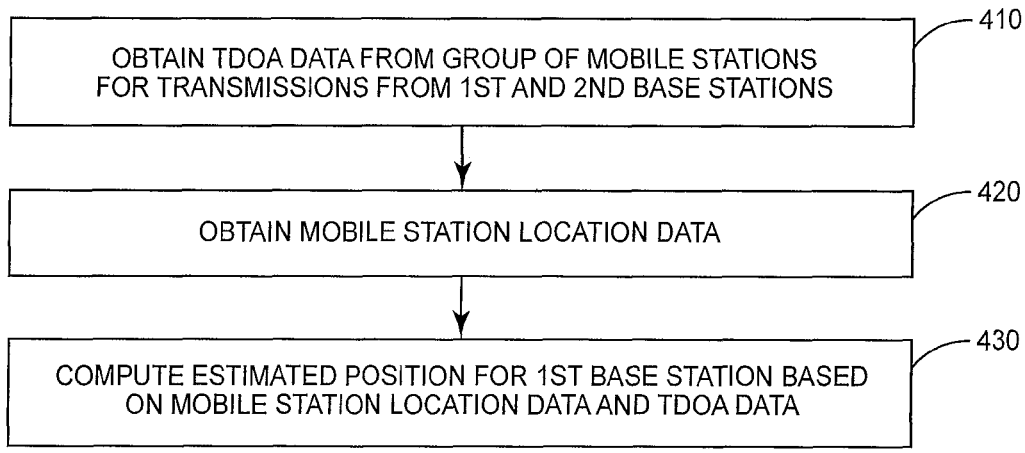
FIG. 4 is a process flow diagram illustrating an exemplary method for determining a position estimate for a base station.

With the above mathematical discussion in mind, those skilled in the art will appreciate that FIG. 4 is a process flow diagram that illustrates a general method for determining a position estimate for a base station transceiver node, according to some embodiments of the invention. As shown at block 410, the process begins with the collection of a set of TDOA measurements from a group of mobile stations that are able to receive and make measurements on transmissions from a first base station transceiver node of interest and a second base station transceiver node. Especially if the base stations are operating in a synchronized system, these TDOA measurements may have been obtained ahead of time, i.e., significantly before the base station position estimate is needed by the location server. In other cases, the TDOA measurement may be collected on demand, e.g., by requesting measurements from mobile stations that are known or predicted to be in the vicinity of the first and second base stations. This latter approach may be especially advantageous if the base station transmissions are not synchronized, as the real time difference between the base stations will not remain constant in this case.

At block 420, mobile station location data corresponding to the TDOA measurements is collected. In some embodiments, this location data may be stored in a database along with the TDOA measurements. In other embodiments, the location of a given mobile station may be requested along with a request for the TDOA measurements. Of course, this step assumes that the location of the mobile station is accessible without knowledge of the first and second base station positions. While this may not be possible for all mobile stations, location data may be available for mobile stations that are able to determine their own position, such as by using GPS, A-GPS, GNSS, A-GNSS, or the like. Those skilled in the art will appreciate that assistance data for A-GPS positioning can be generated based on only a rough estimation of the mobile station's location—thus a location server can provide assistance to a properly equipped mobile station without precise base station location information.

Figure 5:
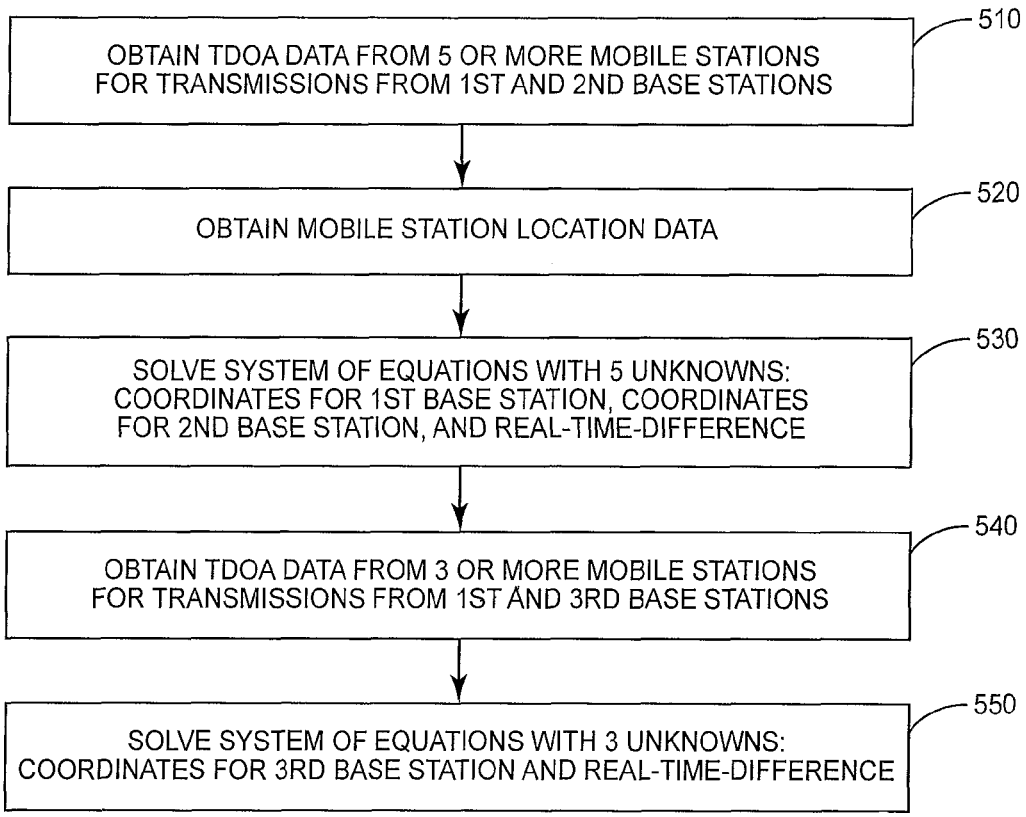
FIG. 5 is another process flow diagram illustrating a method for estimating a base station location.

As shown at block 430, an estimated position for the first base station is then computed, as a function of the first mobile station location data and the first set of TDOA measurement data. As discussed in detail above, if the first set of TDOA measurement data is obtained from at least five mobile stations, then values for five unknown variables can be estimated, including the coordinates of the first and second base stations and a real time difference value corresponding to a time offset between transmissions from the first and second base station transceiver nodes. This is shown in the more detailed process flow diagram of FIG. 5, which illustrates the collection of TDOA data from five or more mobile stations at block 510, the obtaining of corresponding mobile station location data at block 520, and the solving of the resulting system of equations having five unknowns at block 530. In particular, a system of non-linear equations formed from the TDOA observations using the formulations in Equations (2)-(4), for example, may be solved by linearizing the equations and then using an iterative least squares algorithm to find a solution for the linearized equations. Of course, other techniques for solving non-linear systems of equations may also be used.

Once the first (and second) base station positions are estimated, this information can be used to simplify the estimation of positions of subsequent base stations. This is shown at blocks 540 and 550 of FIG. 5. At block 540, TDOA data is collected from three or more mobile stations for transmissions received from the first base station (for which a location is now known) and a third base station (for which a location is unknown). Because the coordinates of the first base station are known, a system of equations like the one used before may be formed, but with only three unknowns: first and second coordinate values for the third base station transceiver node, and a real time difference value corresponding to a time offset between transmissions from the first and third base station transceiver nodes. As before, the mobile station locations corresponding to the TDOA measurements must be known.

If the real time difference for two base stations of interest is known, then a similar procedure can be performed to estimate the positions of the base stations. In this case, a set of TDOA measurements obtained from four or more mobile stations (or a smaller number of mobile stations, but from at least four locations) may be used, as shown at block 610 of FIG. 6. Mobile station location data identifying the mobile station position corresponding to each TDOA measurement in the measurement set is obtained, as shown at block 620, and real-time difference data for the first and second base stations is obtained, as shown at block 630. Given the known mobile station locations, the real-time-difference value for the first and second base stations, and the TDOA measurements from four locations, then a system of equations with four unknowns can be formed, the four unknowns consisting of a first and second coordinate value for the first base station location and a first and second coordinate value for the second base station location.

Although the preceding techniques may be performed using TDOA measurements that are retrieved directly from mobile stations as needed, an alternative approach is to build and/or maintain a database of TDOA measurements, stored along with corresponding known positions for the measuring mobile stations. For example, a location server may be configured to perform UE-assisted OTDOA procedures in parallel or in sequence with A-GPS and/or GPS-based positioning requests, and to store the TDOA measurements along with the results of the other positioning procedure. As noted above, in many situations the location server may provide assistance data as needed, since precise location information for the serving base stations is not needed. Instead, a reference location for the purposes of generating assistance information can be deduced based on a rough location for the mobile station determined from the cell ID and/or the associated Service Area Code (SAC) or Location Area Code (LAC).

Figure 7:
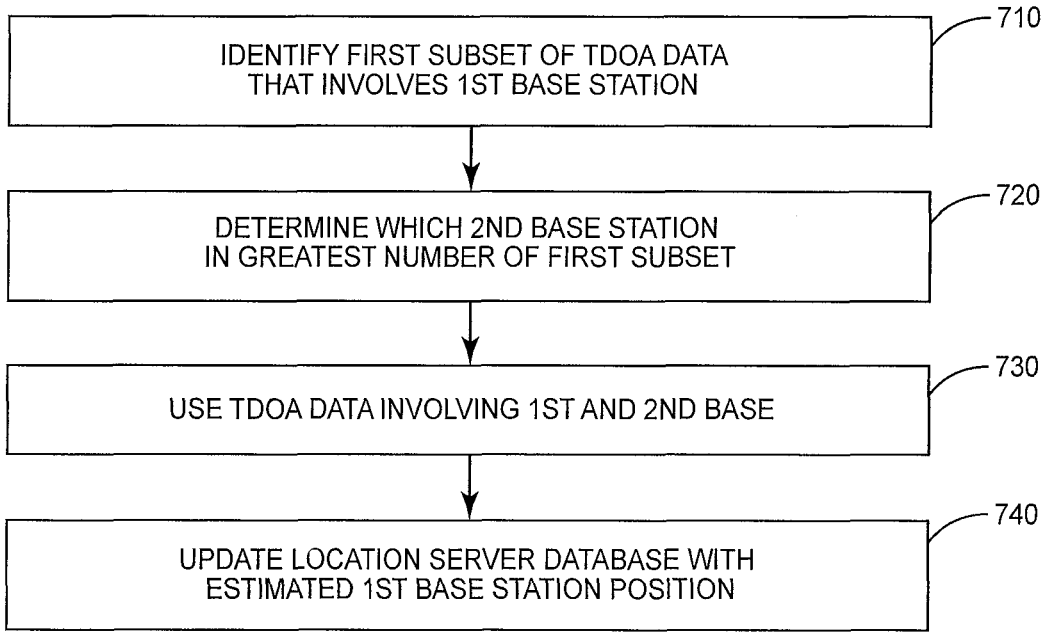
FIG. 7 illustrates yet another exemplary method for estimating a base station location.

FIG. 7 thus illustrates an exemplary method for determining an estimated position for a base station transceiver node, given a database of stored TDOA measurements and corresponding mobile station locations. Because each TDOA measurement involves a pair of base stations, there are likely to be a number of TDOA measurements involving the base station of interest (the "first" base station)—each of these may involve one of several neighbor base stations. Thus, as shown at block 710, the process begins with evaluating the database of TDOA measurements to identify a subset of the TDOA measurements that involve the first base station transceiver node. This subset is then evaluated in turn to see which other base station is involved in more of the measurements in the subset than any other, as shown at block 720. In other words, if the number of measurements involving the first base station and any second base station i is designated $N_{1,i}$, then the value of i that maximizes $N_{1,i}$ is found. If, for example, this corresponds to the k-th base station, then all or some of the $N_{1,k}$ measurements are used to determine the position of the first base station, as shown at block 730, using the techniques described above. Using all of the measurements will generally provide a better estimate. On the other hand, if more than enough measurements are available, a subset that is expected to be particularly reliable or accurate may be used.

In any case, once the position of the first base station is estimated, the estimated position is stored in a database of base station positions, as shown at block 740, for use in subsequent mobile positioning operations. These steps might be repeated periodically, for a given base station, to ensure that the stored position estimates are based on the most recent and/or most comprehensive set of measurements available. Alternatively, a position estimate for the first base station may be re-calculated upon receiving new OTDOA measurements.

Those skilled in the art will appreciate that the techniques discussed above can be readily applied to base stations in a synchronized network, where the real time difference between a given pair of base stations remains constant. For non-synchronized networks, on the other hand, since RTD is always changing, several approaches can be taken to ensure that the position estimation procedure is accurate. For example, in some scenarios the mobile station may be able to acquire real-time RTD information, using the wireless network's location-related procedures. For example, the mobile station can send a request to the base station, and the base station may collect RTD information from other base stations or the core network and return the information to the requesting mobile station. In some networks, the transfer of this information may be standardized as part of the positioning assistance procedures. The location server in these instances may then in turn collect the RTD information from the mobile station.

For situations in which the RTD information is unavailable from the (unsynchronized) network, the location server may instead impose a time window of a pre-determined duration when selecting TDOA measurements for use in estimating a base station position. This time window ensures that the TDOA measurements are made within a short time of one another, so that the RTD associated with each measurement is relatively constant. In general, if it is assumed that differences between reference frequencies among base stations of interest are limited to R parts-per-million (ppm), then the RTD associated with TDOA measurements involving those base stations will drift no more than R*T microseconds over a window of T seconds. This corresponds to a distance error (for a single worst-case TDOA measurement) of $R*T*c/(1.0 \times 10^6) = 300*R*T$ meters. If a large number of TDOA measurements are available to the location server, a subset of those measurements that were made during a short time window can be preferentially used as inputs, thus minimizing the impact of radio clock discrepancies. For example, if the drift rate is known to be limited to no more than 0.01 ppm, and if the desired accuracy for the base station position estimate is 60 meters or better, then the maximum time window length is 20 seconds. Thus, any group of measurements that fall within any window of 20 seconds duration can be used as inputs for the proposed method.

In still another approach, if a database of prior TDOA measurements is not available, or if no suitable subset of such a database meets the time window limitations described above, then the location server may simultaneously (or quasi-simultaneously) send positioning requests to several mobile stations whose locations are known or expected be in the vicinity of the base station of interest. Although this approach provides for the efficient and timely collection of relevant measurement data, it does require some degree of a priori knowledge of the mobile stations' general locations.

The three approaches discussed above for adapting some embodiments of the present invention to asynchronous networks have limitations, however. For instance, the first approach, in which a mobile station obtains real-time or near-real-time RTD information from the network, adds an undesirable network dependency to the solution, and makes the overall user plane solution more complicated. The second approach, in which only measurements falling within a pre-defined time window are used, so that the impact of base station clock drift can be ignored, also has limitations. In particular, a relatively narrow window implies a limited number of valid measurements. In some situations, this may result in degraded accuracy of the RTD and base station location estimations. The third approach, in which the location server simultaneously (or near-simultaneously) sends positioning requests to several mobile stations that are believed to be in the neighborhood of the base station of interest, can be used to mitigate this problem somewhat. Of course, this approach requires a priori knowledge of the general location of a number of mobile stations. Further, this approach may be ineffective if there are an insufficient number of mobile stations in the appropriate geographical area.

In some embodiments of the present invention, these limitations can be avoided by exploiting timestamps associated with TDOA measurements. Appropriate timestamp information is currently among several air-interface parameters under discussion by the 3$^{rd}$-Generation Partnership Project for future standardization. As described in further detail below, this timestamp information can be used to estimate clock drift of a given base station, along with the estimation of its geographical coordinates.

By estimating each base station's clock drift rate, these embodiments also enable the possibility of detecting the synchronous/asynchronous nature of a given network, which can be important for building up operator-independent location service. The base station drift rates estimated with these techniques can also be used to determine more accurate AGNSS timing assistance for use by the mobile stations.

Several relevant proposals have been raised in 3GPP RAN2 standardization discussions. First, it has been proposed that mobile stations report TDOA measurements together with a timestamp that indicates the moment when the measurements were made. As currently proposed in 3GPP RAN2 discussion on LPP (LTE Positioning Protocol), the timestamp would be defined via a system frame number. In an LTE system, then, the accuracy of such an approach would be 10 milliseconds, corresponding to the duration of an LTE frame.

Another approach is to specify both the system frame number and a subframe number. In LTE, this approach would yield an accuracy of 1 millisecond, the duration of an LTE subframe. Still another approach is to use timing information obtained from a GNSS system to produce the timestamp—this approach could yield accuracies as low as 1 millisecond, or even less.

To illustrate the application of this timestamp to the determination of position estimates for base station transceiver nodes in a wireless communication system, let $t_{UEi}$ be the timestamp of the TDOA measurement from the i-th mobile station regarding BS1 and BS2. The impact of base station clock drift can then be taken into account by replacing the variable $RTD_1$ in Equation (2) with the expression shown below:

$$RTD_1 => RTD_1 + DR_1 * (t_{UEi} - t_0) + DR2_1 * \frac{(t_{UEi} - t_0)^2}{2}, \tag{14}$$

where $DR_1$ and $DR2_1$ are the first-order and second-order drift rate between BS1 and BS2, respectively. $t_0$ is the time when $RTD_1$ is valid. In practice, it is possible to sort all measurements from all mobile stations by their timestamp, then use the earliest timestamp as $t_0$. So, for the first measurement in time domain, $t_{UEi} - t_0 = 0$, so:

$$RTD_1 => RTD_1 + DR_1 * 0 + DR2_1 * 0. \tag{15}$$

According to the substitution above, equation (2) can then be extended as:

$$r_{UEi\_1} - r_{UEi\_2} + \tag{16}$$
$$\left(RTD_1 + DR_1 * (t_{UEi} - t_0) + DR2_1 * \frac{(t_{UEi} - t_0)^2}{2}\right) * c =$$
$$(\Delta t_{UEi} + n_{UEi}) * c,$$

where: $\tag{17}$
$$r_{UEi\_1} - r_{UEi\_2} =$$
$$\sqrt{(x_{UEi} - x_1)^2 + (y_{UEi} - y_1)^2} - \sqrt{(x_{UEi} - x_2)^2 + (y_{UEi} - y_2)^2}.$$

Note that the term $(t_{UEi} - t_0)$ is known.

As discussed earlier, a location server can perform other high-accuracy methods, such as A-GPS or conventional GPS, to get the mobile's position, either in parallel or in sequence with OTDOA. Therefore, in the above equations, only ($x_1$, $y_1$),($x_2$,$y_2$), $RTD_1$, $DR_1$ and $DR2_1$ are unknown. Thus, given a minimum of seven independent measurements, the seven unknown values can be determined. (Compare to the five unknown variables in equations (2)-(4), above.)

For example, given a first guess of $(x'_1, y'_1, x'_2, y'_2, RTD_1'*c, DR'_1, DR2'_1)$ and n valid TDOA measurements, the left side of equation (16) can be linearized using Taylor-series (ignoring the second- and higher order terms):

$$f(x_1, y_1, x_2, y_2, RTD_1 * c, \tag{18}$$

$$DR_1 * c, DR2_1 * c) = \sqrt{(x_{UEi} - x_1)^2 + (y_{UEi} - y_1)^2} -$$
$$\sqrt{(x_{UEi} - x_2)^2 + (y_{UEi} - y_2)^2} +$$
$$RTD_1 * c + DR_1 * (t_{UEi} - t_0) * c +$$
$$DR2_1 * \frac{(t_{UEi} - t_0)^2}{2} * c$$
$$\approx f(x'_1, y'_1, x'_2, y'_2, RTD'_1 * c, DR'_1 * c, DR2'_1 * c) +$$
$$\frac{\partial f}{\partial x_1} \cdot dx_1 + \frac{\partial f}{\partial y_1} \cdot dy_1 + \frac{\partial f}{\partial x_2} \cdot$$
$$dx_2 + \frac{\partial f}{\partial y_2} \cdot dy_2 + \frac{\partial f}{\partial (RTD_1 * c)} \cdot$$
$$d(RTD_1 * c) + \frac{\partial f}{\partial (DR_1 * c)} \cdot d(DR_1 * c) + \frac{\partial f}{\partial (DR2_1 * c)} \cdot$$
$$d(DR2_1 * c)$$
$$= (r'_{UEi\_1} - r'_{UEi\_2}) + RTD'_1 * c + DR'_1 * (t_{UEi} - t_0) * c +$$
$$DR2'_1 * \frac{(t_{UEi} - t_0)^2}{2} * c - (x_{UEi} - x'_1) \cdot dx_1 / r'_{UEi\_1} -$$
$$(y_{UEi} - y'_1) \cdot dy_1 / r'_{UEi\_1} + (x_{UEi} - x'_2) \cdot dx_2 / r'_{UEi\_2} +$$
$$(y_{UEi} - y'_2) \cdot dy_2 / r'_{UEi\_2} + d(RTD_1 * c) +$$
$$(t_{UEi} - t_0) \cdot d(DR_1 * c) + \frac{(t_{UEi} - t_0)^2}{2} \cdot d(DR2_1 * c$$

Based on the linearized expression, equation (16) can be written as:

$$G \cdot d \approx h, \tag{19}$$

where (20)

$$G = \begin{bmatrix} -\frac{(x_{UE1} - x'_1)}{r'_{UE1\_1}}, -\frac{(y_{UE1} - y'_1)}{r'_{UE1\_1}}, \frac{(x_{UE1} - x'_2)}{r'_{UE1\_2}}, \frac{(y_{UE1} - y'_2)}{r'_{UE1\_2}}, 1, (t_{UE1} - t_0), \frac{(t_{UE1} - t_0)^2}{2} \\ -\frac{(x_{UE2} - x'_1)}{r'_{UE2\_1}}, -\frac{(y_{UE2} - y'_1)}{r'_{UE2\_1}}, \frac{(x_{UE2} - x'_2)}{r'_{UE2\_2}}, \frac{(y_{UE2} - y'_2)}{r'_{UE2\_2}}, 1, (t_{UE2} - t_0), \frac{(t_{UE2} - t_0)^2}{2} \\ \vdots \\ -\frac{(x_{UEn} - x'_1)}{r'_{UEn\_1}}, -\frac{(y_{UEn} - y'_1)}{r'_{UEn\_1}}, \frac{(x_{UEn} - x'_2)}{r'_{UEn\_2}}, \frac{(y_{UEn} - y'_2)}{r'_{UEn\_2}}, 1, (t_{UEn} - t_0), \frac{(t_{UEn} - t_0)^2}{2} \end{bmatrix},$$

$$d = \begin{pmatrix} dx_1 \\ dy_1 \\ dx_2 \\ dy_2 \\ d(RTD_1 * c) \\ d(DR_1 * c) \\ d(DR2_1 * c) \end{pmatrix}, \text{ and} \tag{21}$$

$$h = c * \begin{pmatrix} \Delta t_{UE1} - (r'_{UE1\_1} - r'_{UE1\_2})/c - RTD'_1 - DR'_1 * (t_{UE1} - t_0) - DR2'_1 * \frac{(t_{UE1} - t_0)^2}{2} + n_{UE1} \\ \Delta t_{UE2} - (r'_{UE2\_1} - r'_{UE2\_2})/c - RTD'_1 - DR'_1 * (t_{UE2} - t_0) - DR2'_1 * \frac{(t_{UE2} - t_0)^2}{2} + n_{UE2} \\ \vdots \\ \Delta t_{UEn} - (r'_{UEn\_1} - r'_{UEn\_2})/c - RTD'_1 * c - DR'_1 * (t_{UEn} - t_0) - DR2'_1 * \frac{(t_{UEn} - t_0)^2}{2} + n_{UEn} \end{pmatrix}. \tag{22}$$

The least-square solution is therefore (ignoring the noise in h):

$$d = (G^T \cdot G)^{-1} \cdot G^T \cdot h. \tag{23}$$

If TDOA measurement covariance matrix Q is available, then the below solution can be used instead:

$$d = (G^T Q^{-1} G)^{-1} G^T Q^{-1} h, \tag{24}$$

$$\text{cov}(d) = (G^T Q^{-1} G)^{-1}. \tag{25}$$

Either of the above formulations can be solved using an iterative least-square algorithm, although other techniques for solving non-linear systems of equations might be used. In subsequent iterations of the iterative least-squares approach, the formulations above are based on an updated base station position:

$$(x'_1, y'_1, x'_2, y'_2, RTD_1'^*c, DR'_1, DR2'_1) = (x'_1, y'_1, x'_2, y'_2, RTD_1'^*c, DR'_1, DR2'_1) + d^T; \tag{25}$$

the iterative process continues until d is sufficiently small. The resulting final vector $(x'_1, y'_1, x'_2, y'_2, RTD_1'^*c, DR'_1, DR2'_1)$ provides estimates of the two-dimensional geographic coordinates for BS1 and BS2, the real time difference (RTD) between BS1 and BS2, and the first-order and second-order clock drift between BS1 and BS2.

As noted briefly above, the timestamp information in some embodiments of the invention may be referenced to a system frame number, subframe number, and/or to some other indicator that is tied to timing of the transmissions from one or more of the base stations of interest. Typically, however, the system frame number or similar index is subject to a so-called roll-over—because the number of bits used to express the index is limited, the index re-starts periodically. For instance, in LTE systems, the system frame number (SFN) rolls over every 10.24 seconds. Accordingly, in order to deduce absolute time $t_{UEi}$ (i.e., to remove ambiguity from the timestamp information), extra analysis may be necessary.

In a practical system, there are at least three possible general approaches. In one approach, it is assumed that each mobile station is able to obtain GPS time corresponding to when the TDOA measurements are made. In this case, the mobile station is A-GPS-enabled and/or is combined with a GPS receiver. For each TDOA measurement, the mobile station can simply record the GPS time when measurement was performed. This recorded GPS time can be reported to a position-estimating node and directly used as $t_{UEi}$ in determining the base station positions, real time differences, and clock drifts, as described above. With this approach, SFN and subframe number are redundant. While GPS time is also subject to a roll-over, this occurs only once a week, i.e., 604,800 seconds, this can be easily detected and corrected in any case.

A second approach might be used where one or more mobile stations is neither A-GPS/GPS capable nor combined with a GPS receiver. In this case, the mobile station can record its local time $t_{LOi}$ for each TDOA measurement. Because mobile stations are often equipped with low-cost crystal oscillators, time error will be inevitable. The actual time interval between adjacent TDOA measurements can be estimated by:

$$\Delta t = \text{round}\left(\frac{t_{LO2} - t_{LO1} - \Delta SFN * \text{frame\_duration}}{\text{rollover\_time}}\right) * \text{rollover\_time} + \Delta SFN * \text{frame\_duration} \tag{26}$$

where ΔSFN is the difference between the SFN for the two adjacent OTDOA measurements, and frame_duration and rollover_time are 10 milliseconds and 10.24 seconds for LTE, respectively.

This method can handle a time error due to mobile station local clock drift up to $$\frac{\text{rollover\_time}}{2}.$$

This disambiguation, using the mobile station's locally observed time, can be performed at the mobile station itself, or at a network server.

In a third approach, it is assumed that the E-SMLC or other position-determining node is able to get mobile station measurements in a timely fashion. By applying the ambiguity-solving principle as above, if each mobile station is able to report TDOA measurements to the E-SMLC with a maximum uncertainty of $$\frac{\text{rollover\_time}}{4},$$

i.e. 2.5 seconds for LTE, the E-SMLC can then figure out the exact time interval between adjacent TDOA measurements. With this approach, the reporting mobile station need not be equipped with GPS capabilities.

Figure 11:
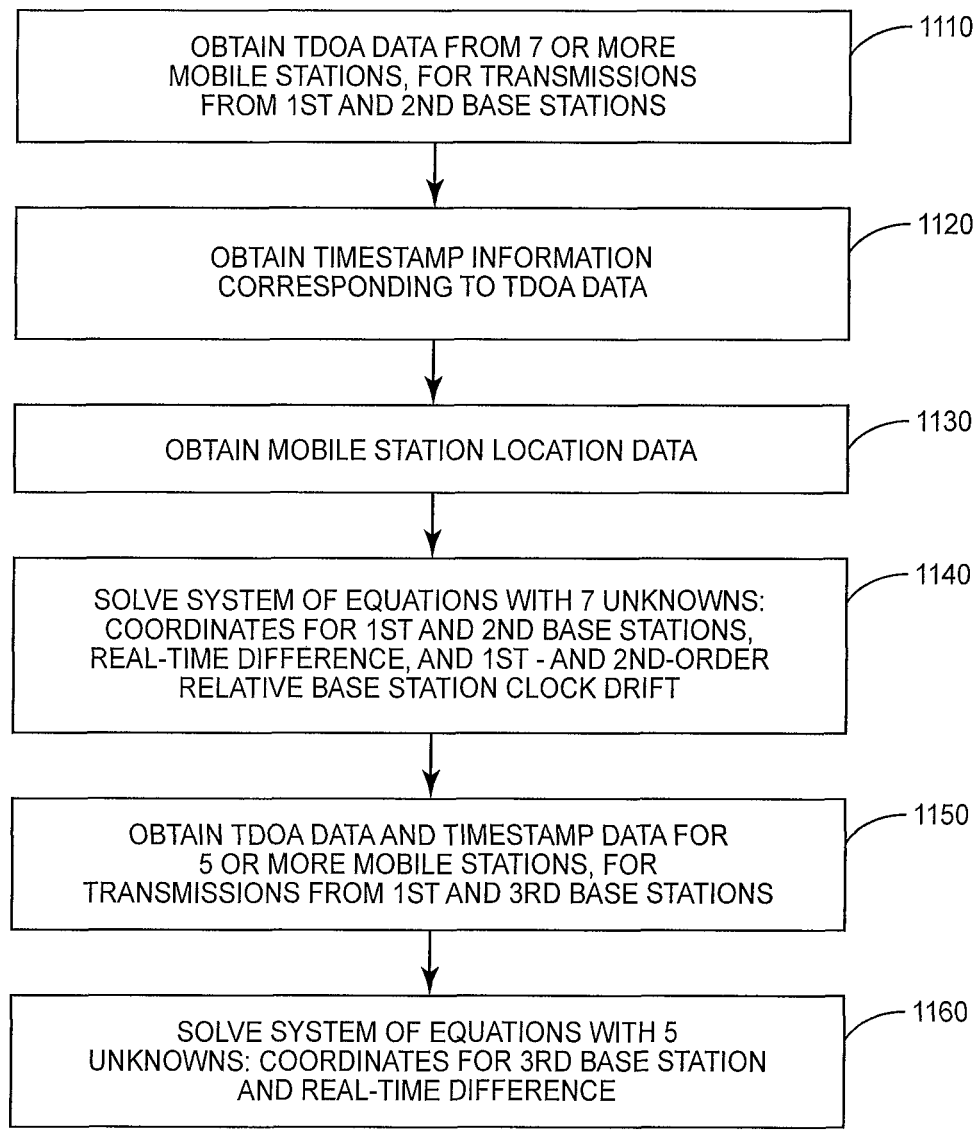
FIG. 11 is a process flow diagram illustrating another exemplary method for estimating a base station location, using at least seven TDOA measurements.

With the above discussion in mind, those skilled in the art will appreciate that the techniques described above, which account for clock drift while determining base station locations, are consistent with the process flow illustrated generally in FIG. 4 and described earlier. FIG. 11 is a more detailed process flow diagram, applicable to some embodiments of the present invention. In particular, FIG. 11 illustrates the collection of TDOA data pertaining to first and second base stations from seven or more mobile stations at block 1110, the obtaining of corresponding mobile station location data at block 1130, and the solving of the resulting system of equations having seven unknowns at block 1140. Unlike the process pictured in FIG. 5, which does not directly address clock drift, the process illustrated in FIG. 11 includes the obtaining of timestamp information corresponding to the TDOA data obtained at block 1110; this obtaining of timestamp information is shown at block 1120 and, as discussed above, may be based on frame numbers or other indices to the wireless network timing, and/or to each mobile station's locally maintained time, and/or to GPS time, in various embodiments of the illustrated process.

As indicated at block 1140, a system of equations with seven unknowns is solved. These unknowns include two-dimensional coordinates for the first and second base stations, a real-time-difference value for the first and second base stations, and first- and second-order relative, clock drift parameters characterizing the relative drift between the time bases for the first and second base stations. This system of equations may comprise a system of non-linear equations formed from the TDOA observations using the formulations in Equations (16) and (17), for example, and may be solved by linearizing the equations and then using an iterative least squares algorithm to find a solution for the linearized equations. The two additional unknown parameters ($DR_1, DR2_1$) can be set to zero at the beginning of an iterative weighted-least-squares algorithm, for example, or an experiential value according to historical information may be used to initialize the algorithm. Once again, other techniques for solving non-linear systems of equations may also be used.

Of course, the process illustrated in FIG. 11 is only exemplary of the techniques. Several variations of these techniques are disclosed herein, but still others are possible and fall within the scope of the present invention as set forth in the appended claims. For instance, the process illustrated in FIG. 11 is based on a second-order model for the relative clock drift between base stations. Other models may be used. For instance, a single-order model may be used, in which case the relative clock drift is characterized by a single, first-order parameter, rather than the two parameters discussed above. In this case, only six mobile stations are necessary to form a system of equations from which two base station locations, a real time difference, and the first-order relative clock drift can be determined. Those skilled in the art will appreciate that a higher-order model might also be used, in some embodiments, even though such precise modeling of the clock drift may not be required in many systems.

FIG. 11 further illustrates that once a first base station location is known, its known location can be used to simplify the process of determining additional base station locations. In particular, TDOA and timestamp data need only be collected from only five mobile stations, if the location is already known for one of the base stations to which the TDOA data relates. Thus, as shown at block 1150, TDOA data and timestamp data is obtained from five or more mobile stations, for transmissions from the first base station and a third base station. Then, as shown at block 1170, a system of equations with five unknowns is solved, using techniques similar to those described above for Equations (16) and (17). The five unknowns in this case include two-dimensional coordinates for the third base station, a real time difference for the first and third base stations, and first- and second-order relative base station clock drift parameters characterizing the drift between the time bases for the first and third base station. This process can be repeated for additional base stations.

In practice, data from more than seven mobile stations may be used in a given implementation, as more data will generally provide a more accurate result. Thus, in some embodiments, a location server may pick out from a database all TDOA measurements that were measured at different positions within a neighborhood of a first base station's coverage (perhaps within a given time window), together with the corresponding AGPS/AGNSS fixes. Given the total number of TDOA measurements for each base station i that are related to this first base station, $N_{1,i}$, then a number i=k that maximizes $N_{1,i}$ can be found, to identify the base station pair for which the most TDOA measurements are available. All of these $N_{1,k}$ measurements which includes $\Delta t_{1,k}$ or $\Delta t_{k,1}$ can be used as inputs for the techniques described above, since more measurements generally provide a better estimate. Alternatively, if more than enough measurements are available, a subset, such as a subset that is known to be particularly reliable, may be selected for use.

In some embodiments, the timestamps for the measurements may be referenced to a single one of the measurements. For example, given $N_{1,k}$ measurements, an "absolute time" might be calculated for each measurement, and the earliest one designated as $t_0$. Then, $$(t_{UEi} - t_0) \text{ and } \frac{(t_{UEi} - t_0)^2}{2},$$

can be computed for each mobile station, for use in the above equations, such as Equation (20).

As noted above, the first-order and second-order relative clock drift parameters characterize the relative clock drift between two base stations. Such information is very useful in developing and/or maintaining a database of base station information for geo-location and other location-based applications. For instance, the clock drift information may be used to determine whether base stations in any given pair are synchronized to one another. If the two base stations are well synchronized, then a location server or other control node (e.g., an E-SMLC) then has the option not to frequently update the time relation between these base stations. This can in turn reducing network signaling, because such updates in an LTE system require signaling exchanges between the E-SMLC and the base station (eNodeB), and may also require extra signaling among relevant eNodeBs, such as over the LTE X2 interface.

Furthermore, the relative clock drift information can be used, e.g., together with cell radius data, to generate assistance information for OTDOA-based location, without contacting the eNodeB. For instance the so-called expectedRSTD and expectedRSTD-Uncertainty parameters as defined in 3GPP TS 36.355 may be determined based on this information.

Still further, a given mobile station may be configured to "remember" which base stations are synchronized, or to estimate a current real time difference for a given base station pair, based on the drift rate information. If the latter approach is used, it may be possible for a mobile station to perform OTDOA positioning without being supplied explicit RTD information, in some circumstances.

Those skilled in the art will appreciate that aspects of the above uses of clock drift information apply to both Control Plane and User Plane solutions. When applied to the User Plane, the dependence of OTDOA positioning techniques on an operator's access network is reduced, because the drift rate can be calculated only if there is OTDOA traffic in the network.

Finally, it will be noted that relative drift rate information is obtained according to the techniques described above. The relation among the obtained drift rates can be interpreted in a "daisy chain" fashion, if the appropriate relative drift rates are available. For instance, a chain of three base stations have relative drift rates that can be characterized as differences between absolute clock drift rates as follows: {DR_BS1−DR_BS2; DR_BS2−DR_BS3; DR_BS3−DR_BS1}. If the absolute drift rate of just one of these base stations is available (e.g., via other measurement techniques), then such a daisy chain can be "broken," and the absolute drift rate of the other base stations in the chain can be easily calculated. When absolute drift rate is known, it can be used by an E-SMLC or a SUPL server to deduce the validity period of AGNSS time assistance, permitting more reliable time assistance for AGNSS positioning to be provided to mobile stations.

The various techniques described above may be implemented by a positioning platform located within the wireless network of interest, tightly coupled to the wireless network (e.g., through proprietary data interfaces), or entirely separate from the wireless network. At a minimum, the positioning platform needs access only to a set of TDOA measurement data from several mobile stations and location data identifying the mobile station position corresponding to each measurement. As discussed above, this information may be available in some scenarios via SUPL-based communications between the positioning platform and the mobile stations, so that no control plane interaction between the positioning platform and wireless network nodes is needed.

Figure 8:
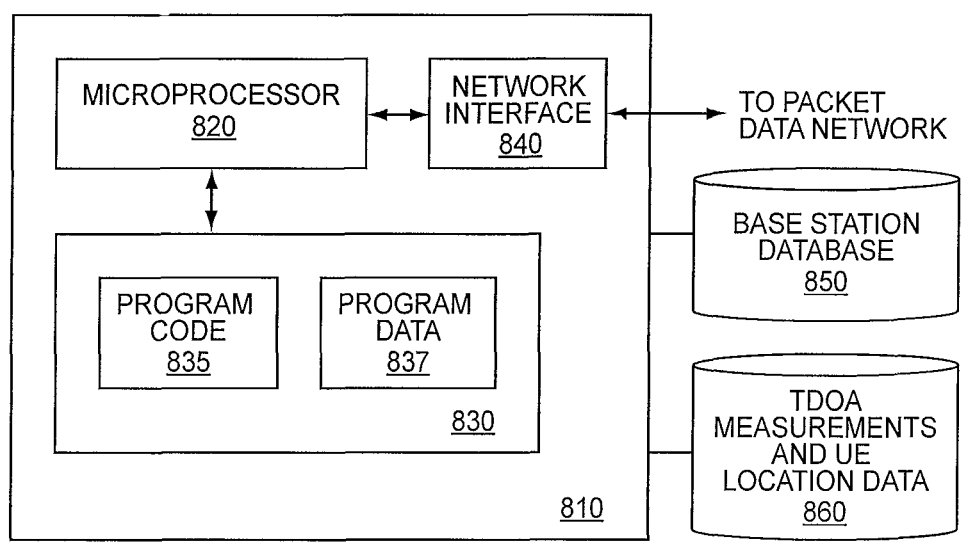
FIG. 8 is a block diagram illustrating a positioning node according to some embodiments of the invention.

FIG. 8 is a block diagram illustrating functional elements of a position-estimating node 810 according to some embodiments of the present invention. Although generally described herein in terms of a location server, those skilled in the art will appreciate that the base station position estimation techniques described herein are not limited to implementation on conventional server platforms. Indeed, the techniques described herein may also be adapted to and implemented in a wireless mobile station. Thus, the embodiment illustrated in FIG. 8 is provided for illustrative purposes only, and is not intended to suggest that the inventive apparatus disclosed herein is limited to fixed platforms.

In any event, the illustrated position-estimating node 810 comprises processing circuits including one or more microprocessors 820, memory system 830, and network interface 840. Network interface 840 facilitates communication with mobile stations via a packet data network, so that TDOA measurement data and/or mobile station position data can be collected. Memory system 830, which may include several types of memory including RAM, ROM, Flash, magnetic and/or optical storage devices, and the like, is configured to store program code 835 as well as program data 837. Program code 835 comprises program instructions that, when executed by microprocessor(s) 820, configure the position-estimating node 810 to carry out one or more of the base station positioning estimating procedures discussed above.

For instance, program code 835 may comprise program instructions for obtaining a first set of time-difference-of-arrival (TDOA) measurement data from a first plurality of mobile stations, the first set of TDOA measurement data corresponding to transmissions received at the first plurality of mobile stations from the first base station transceiver node and a second base station transceiver node. The program instructions may further comprise instructions for obtaining first mobile station location data identifying a mobile station position corresponding to each TDOA measurement represented in the first set of TDOA measurement data, and computing an estimated position for the base station transceiver node as a function of the first mobile station location data and the first set of TDOA measurement data.

Also shown in FIG. 8 are a base station position database 850 and a TDOA measurement and mobile station location database 860. These databases may be maintained in storage devices physically separate from position-estimating node 810 and accessible by wired or wireless network or point-to-point connections. Alternatively, all or part of either or both of these databases may be maintained within position-estimating node 810. Base station database 850 may be used, for example, to store estimated base station positions calculated according to the techniques described above. TDOA measurement and mobile station location database 860 is used to store TDOA measurements collected from mobile stations and the corresponding mobile station positions. In some embodiments, this may comprise an extensive database built over a significant period of time; in others, this database may simply comprise a set of TDOA measurements and associated mobile stations collected on-demand for the purpose of estimating a particular base station's position.

Those skilled in the art will appreciate a range of methods and apparatus for estimating the position of a base station transceiver node are described above. In some embodiments of the disclosed methods and apparatus, the estimated base station position is obtained using mobile station OTDOA measurements, but without any information received directly from the wireless network operator. Once base station positions have been estimated using these techniques, an appropriately programmed location server can participate in mobile station positioning operations, using the reconstructed cell position data. Those skilled in the art will appreciate that this network independence is especially valuable for providing User Plane location services, such as those contemplated by OMA's SUPL specifications.

In the discussion above, various automatic procedures for mapping of base station positions have been disclosed. Corresponding apparatus, including an exemplary position-estimating node including processing circuits configured to carry out one or more of these procedures have been disclosed. Those skilled in the art will appreciate that still other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein for estimating the position of a base station transceiver node in a wireless communication network. Furthermore, while the techniques and apparatus described above may be particularly useful in connection with LTE networks, where OTDOA is a very important positioning method and is being standardized, those skilled in the art will appreciate that the inventive techniques and apparatus disclosed herein are not limited to LTE networks, and may be broadly applied to other wireless networks where mobile station TDOA measurements and corresponding mobile station positions are available.

Of course, those skilled in the art will recognize that the present invention may be carried out in other ways than those specifically set forth herein without departing from essential characteristics of the invention. The present embodiments are thus to be considered in all respects as illustrative and not restrictive, and all changes coming within the scope of the appended claims are intended to be embraced therein.

The invention claimed is:

1. A method for determining a position estimate for a first base station transceiver node in a wireless communication system, the method comprising:
    obtaining a first set of time-difference-of-arrival (TDOA) measurement data from a first plurality of mobile stations including three or more mobile stations, the first set of TDOA measurement data corresponding to transmissions received at the first plurality of mobile stations from the first base station transceiver node and a second base station transceiver node;
    obtaining first mobile station location data identifying a mobile station position corresponding to each TDOA measurement represented in the first set of TDOA measurement data; and
    computing an estimated position for the base station transceiver node as a function of the first mobile station location data and the first set of TDOA measurement data by solving a system of equations based on the first mobile station location data, the first set of TDOA measurement data, a pre-determined known location for the second base station transceiver, and at least three unknown variables, the three unknown variables comprising first and second coordinate values for the first base station transceiver and a real-time-difference value corresponding to a time offset between transmissions from the first and second base station transceiver nodes.

2. The method of claim 1, wherein the first set of TDOA measurement data is obtained from at least five mobile stations, and wherein computing the estimated position for the first base station transceiver node comprises solving a first system of equations based on the first mobile station location data, the first set of TDOA measurement data, and five unknown variables, the five unknown variables comprising first and second coordinate values for the first base station transceiver, first and second coordinate values for the second base station transceiver node, and a first real-time-difference value corresponding to a time offset between transmissions from the first and second base station transceiver nodes.

3. The method of claim 2, wherein the first set of TDOA measurement data is obtained from at least six mobile stations and, and wherein the first system of equations is further based on a sixth unknown variable corresponding to a relative clock drift rate between the first and second base station transceiver nodes.

4. The method of claim 3, wherein the first set of TDOA measurement data is obtained from at least seven mobile stations, and wherein the first system of equations is further based on a seventh unknown variable corresponding to a second-order relative clock drift rate between the first and second base station transceiver nodes.

5. The method of claim 3, wherein the first set of TDOA measurement data comprises timestamp information indicating the times at which the TDOA measurement data was measured.

6. The method of claim 5, wherein the timestamp information is based, at least in part, on global navigation satellite system timing data.

7. The method of claim 5, wherein the timestamp information comprises indexes to a radio-frame numbering scheme in the wireless communication system.

8. The method of claim 7, wherein the timestamp information further comprises indexes to local measurement times at the plurality of mobile stations, the method further comprising disambiguating the indexes to the radio-frame numbering scheme, using the indexes to local measurement times, to account for rollover intervals of the radio-frame numbering scheme.

9. The method of claim 7, wherein the timestamp information further comprises reporting times corresponding to the times at which the TDOA measurement data was obtained from the first plurality of mobile stations including three or more mobile stations, the method further comprising disambiguating the indexes to the radio-frame numbering scheme, using the reporting times, to account for rollover intervals of the radio-frame numbering scheme.

10. The method of claim 2, wherein solving the first system of equations comprises computing estimates for the five unknown variables using an iterative least squares algorithm.

11. The method of claim 2, further comprising:
    obtaining a second set of TDOA measurement data from a second plurality of mobile stations, the second set of TDOA measurement data corresponding to transmissions received at the second plurality of mobile stations from the first base station transceiver node and a third base station transceiver node;
    obtaining second mobile station location data identifying a mobile station position corresponding to each TDOA measurement represented in the second set of TDOA measurement data; and
    computing an estimated position for the third base station transceiver node by solving a second system of equations based on the computed estimated location for the first base station transceiver node, the second set of TDOA measurement data, the second mobile station location data, and three additional unknown variables, the three additional unknown variables comprising first and second coordinate values for the third base station transceiver and a second real-time-difference value corresponding to a time offset between transmissions from the first and third base station transceiver nodes.

12. The method of claim 11, wherein the second system of equations is further based on an eighth unknown variable corresponding to a relative clock drift rate between the first and third base station transceiver nodes.

13. The method of claim 12, wherein the second system of equations is further based on a ninth unknown variable corresponding to a second-order relative clock drift rate between the first and third base station transceiver nodes.

14. The method of claim 1, wherein the first set of TDOA measurement data is obtained from at least four mobile stations, and wherein computing the estimated position for the first base station transceiver node comprises solving a system of equations based on the first mobile station location data, the first set of TDOA measurement data, a pre-determined real-time-difference value corresponding to a time offset between transmissions from the first and second base station transceiver nodes, and four unknown variables, the four unknown variables comprising first and second coordinate values for the first base station transceiver and first and second coordinate values for the second base station transceiver node.

15. The method of claim 1, wherein obtaining the first set of TDOA measurement data from the first plurality of mobile stations comprises:
   evaluating a database of TDOA measurements to identify TDOA measurements involving the first base station transceiver node;
   selecting the second base station transceiver node by determining which base station transceiver node other than the first base station is involved in at least as many of the identified TDOA measurements as any other base station transceiver node; and
   including all of the identified TDOA measurements that involve the second base station transceiver node in the first set of TDOA measurement data.

16. The method of claim 1, wherein obtaining the first set of TDOA measurement data comprises limiting the first set of TDOA measurement data to TDOA measurements taken within a time window of a predetermined duration.

17. The method of claim 1, wherein obtaining the first set of TDOA measurement data comprises sending TDOA measurement requests to the first plurality of mobile stations and receiving TDOA measurements in response.

18. The method of claim 1, further comprising adding the computed estimated position for the first base station transceiver node to a database of base station positions.

19. A position-estimating node comprising one or more processing circuits configured to:
   obtain a first set of time-difference-of-arrival (TDOA) measurement data from a first plurality of mobile stations including three or more mobile stations, the first set of TDOA measurement data corresponding to transmissions received at the first plurality of mobile stations from a first base station transceiver node and a second base station transceiver node;
   obtain first mobile station location data identifying a mobile station position corresponding to each TDOA measurement represented in the first set of TDOA measurement data; and
   compute an estimated position for the base station transceiver node as a function of the first mobile station location data and the first set of TDOA measurement data by solving a system of equations based on the first mobile station location data, the first set of TDOA measurement data, a pre-determined known location for the second base station transceiver, and at least three unknown variables, the three unknown variables comprising first and second coordinate values for the first base station transceiver and a real-time-difference value corresponding to a time offset between transmissions from the first and second base station transceiver nodes.

20. The position-estimating node of claim 19, wherein the one or more processing circuits are configured to obtain the first set of TDOA measurement data from at least five mobile stations, and are further configured to compute the estimated position for the first base station transceiver node by solving a first system of equations based on the first mobile station location data, the first set of TDOA measurement data, and five unknown variables, the five unknown variables comprising first and second coordinate values for the first base station transceiver, first and second coordinate values for the second base station transceiver node, and a first real-time-difference value corresponding to a time offset between transmissions from the first and second base station transceiver nodes.

21. The position-estimating node of claim 20, wherein the first set of TDOA measurement data is obtained from at least six mobile stations and, and wherein the first system of equations is further based on a sixth unknown variable corresponding to a relative clock drift rate between the first and second base station transceiver nodes.

22. The position-estimating node of claim 21, wherein the first set of TDOA measurement data is obtained from at least seven mobile stations, and wherein the first system of equations is further based on a seventh unknown variable corresponding to a second-order relative clock drift rate between the first and second base station transceiver nodes.

23. The position-estimating node of claim 21, wherein the first set of TDOA measurement data comprises timestamp information indicating the times at which the TDOA measurement data was measured.

24. The position-estimating node of claim 23, wherein the timestamp information is based, at least in part, on global navigation satellite system timing data obtained by the plurality of mobile stations.

25. The position-estimating node of claim 23, wherein the timestamp information comprises indexes to a radio-frame numbering scheme in the wireless communication system.

26. The position-estimating node of claim 25, wherein the timestamp information further comprises indexes to local measurement times at the plurality of mobile stations, and wherein the processing circuits are further configured to disambiguate the indexes to the radio-frame numbering scheme, using the indexes to local measurement times, to account for rollover intervals of the radio-frame numbering scheme.

27. The position-estimating node of claim 25, wherein the timestamp information further comprises reporting times corresponding to the times at which the TDOA measurement data was obtained from the first plurality of mobile stations including three or more mobile stations, and wherein the processing circuits are further configured to disambiguate the indexes to the radio-frame numbering scheme, using the reporting times, to account for rollover intervals of the radio-frame numbering scheme.

28. The position-estimating node of claim 20, wherein the one or more processing circuits are configured to solve the first system of equations by computing estimates for the five unknown variables using an iterative least squares algorithm.

29. The position-estimating node of claim 20, wherein the one or more processing circuits are further configured to:
   obtain a second set of TDOA measurement data from a second plurality of mobile stations, the second set of TDOA measurement data corresponding to transmissions received at the second plurality of mobile stations from the first base station transceiver node and a third base station transceiver node;

obtain second mobile station location data identifying a mobile station position corresponding to each TDOA measurement represented in the second set of TDOA measurement data; and compute an estimated position for the third base station transceiver node by solving a second system of equations based on the computed estimated location for the first base station transceiver node, the second set of TDOA measurement data, the second mobile station location data, and three additional unknown variables, the three additional unknown variables comprising first and second coordinate values for the third base station transceiver and a second real-time-difference value corresponding to a time offset between transmissions from the first and third base station transceiver nodes.

30. The position-estimating node of claim 29, wherein the second system of equations is further based on an eighth unknown variable corresponding to a relative clock drift rate between the first and third base station transceiver nodes.

31. The position-estimating node of claim 30, wherein the second system of equations is further based on a ninth unknown variable corresponding to a second-order relative clock drift rate between the first and third base station transceiver nodes.

32. The position-estimating node of claim 19, wherein the one or more processing circuits are configured to obtain the first set of TDOA measurement data from at least four mobile stations, and are further configured to compute the estimated position for the first base station transceiver node by solving a system of equations based on the first mobile station location data, the first set of TDOA measurement data, a predetermined real-time-difference value corresponding to a time offset between transmissions from the first and second base station transceiver nodes, and four unknown variables, the four unknown variables comprising first and second coordinate values for the first base station transceiver and first and second coordinate values for the second base station transceiver node.

33. The position-estimating node of claim 19, wherein the one or more processing circuits are configured to obtain the first set of TDOA measurement data from the first plurality of mobile stations by:

evaluating a database of TDOA measurements to identify TDOA measurements involving the first base station transceiver node;

selecting the second base station transceiver node by determining which base station transceiver node other than the first base station is involved in at least as many of the identified TDOA measurements as any other base station transceiver node; and including all of the identified TDOA measurements that involve the second base station transceiver node in the first set of TDOA measurement data.

34. The position-estimating node of claim 19, wherein the one or more processing circuits are configured to limit the first set of TDOA measurement data to TDOA measurements taken within a time window of a predetermined duration.

35. The position-estimating node of claim 19, wherein the one or more processing circuits are configured to obtain the first set of TDOA measurement data by sending TDOA measurement requests to the first plurality of mobile stations and receiving TDOA measurements in response.

36. The position-estimating node of claim 19, wherein the one or more processing circuits are further configured to add the computed estimated position for the first base station transceiver node to a database of base station positions.

* * * * *

UNITED STATES PATENT AND TRADEMARK OFFICE
CERTIFICATE OF CORRECTION

PATENT NO. : 8,463,292 B2
APPLICATION NO. : 12/774802
DATED : June 11, 2013
INVENTOR(S) : Zhang It is certified that error appears in the above-identified patent and that said Letters Patent is hereby corrected as shown below:

In the Drawings

Figure 6:
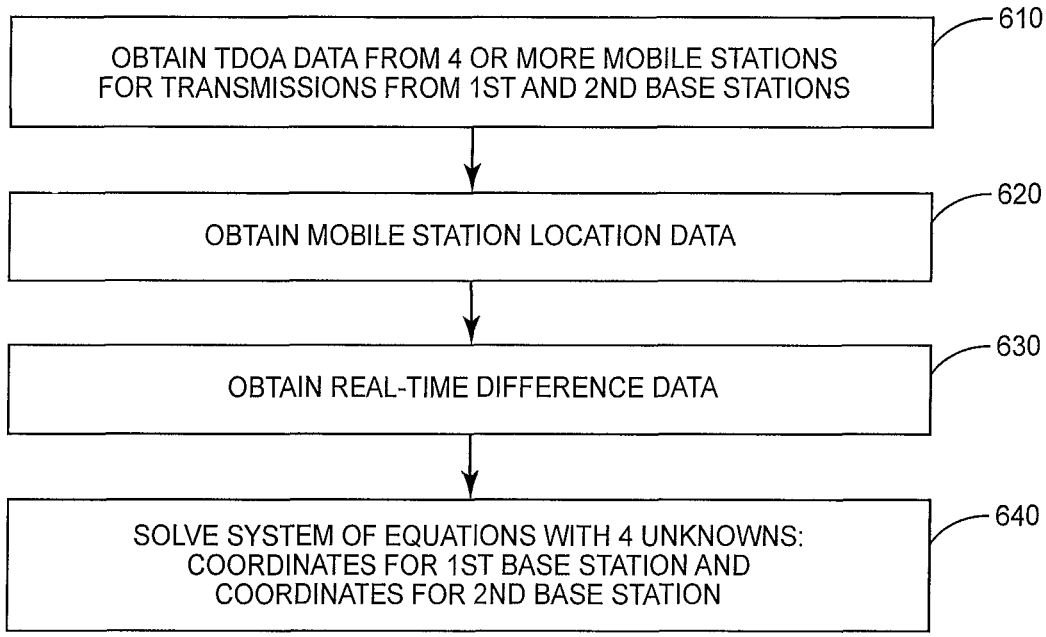
FIG. 6 illustrates another exemplary method for estimating a base station location

In Fig. 6, Sheet 5 of 8, for Tag "630", in Line 1, delete "REAL-TIME DIFFERENCE" and insert -- REAL-TIME-DIFFERENCE --, therefor.

In Fig. 11, Sheet 8 of 8, for Tag "1140", in Line 3, delete "REAL-TIME DIFFERENCE," and insert -- REAL-TIME-DIFFERENCE, --, therefor.

In the Specification

In Column 4, Line 48, delete "location" and insert -- location. --, therefor.

In Column 6, Line 26, delete "an prior" and insert -- a prior --, therefor.

In Column 6, Line 60, delete "UE 155," and insert -- UE 115, --, therefor.

In Column 6, Line 62, delete "E-SMLC 115" and insert -- E-SMLC 155 --, therefor.

In Column 9, Line 2, delete "($(x_1,y_i)$ and $(x_2,y_2)$)" and insert -- ($(x_1,y_1)$ and $(x_2,y_2)$) --, therefor.

In Column 9, Line 59, delete "BS1 and B2" and insert -- BS1 and BS2 --, therefor.

In Column 12, Line 27, delete "real-time difference" and insert -- real-time-difference --, therefor.

In Column 16, in Equation (18), Line 15, delete "$(t_{UEi} - t_0) \cdot d(DR_1 * c) + \frac{(t_{UEi} - t_0)^2}{2} \cdot d(DR2_1 * c)$" and Signed and Sealed this
Twelfth Day of August, 2014

Michelle K. Lee
*Deputy Director of the United States Patent and Trademark Office*

CERTIFICATE OF CORRECTION (continued)
U.S. Pat. No. 8,463,292 B2 insert -- $(t_{UEi} - t_0) \cdot d(DR_1 * c) + \dfrac{(t_{UEi} - t_0)^2}{2} \cdot d(DR2_1 * c) \cdot$ --, therefor.

In the Claims

In Column 24, Line 11, in Claim 3, delete "and, and" and insert -- and --, therefor.

In Column 26, Line 23, in Claim 21, delete "and, and" and insert -- and --, therefor.